United States Patent Office 3,376,316
Patented Apr. 2, 1968

3,376,316
LOWER ALKYL GAMMA KETO ACID
2-PYRANYL ESTERS
George Gal, Summit, and Meyer Sletzinger, North Plainfield, N.J., assignors to Merck & Co., Inc., Rahway, N.J., a corporation of New Jersey
No Drawing. Original application Dec. 28, 1962, Ser. No. 247,859, now Patent No. 3,171,841, dated Mar. 2, 1965. Divided and this application Aug. 21, 1964, Ser. No. 399,953
2 Claims. (Cl. 260—345.8)

ABSTRACT OF THE DISCLOSURE

Compounds of the class lower alkyl gamma keto acid 2-pyranyl esters useful as intermediates in the preparation of 1-acyl indole-3-aliphatic acids, which compounds are useful as anti-inflammatory agents.

This is a divisional application of Ser. No. 247,859, filed Dec. 28, 1962, now U.S. Patent No. 3,171,841.

This invention relates to novel tetrahydro-2-pyranyl esters of indolyl aliphatic acids, which compounds are useful as chemical intermediates, and to a novel process for the preparation thereof. The invention is also concerned with novel tetrahydro-2-pyranyl esters of gamma keto acids and to methods of preparing same, which materials are used in preparing said tetrahydro-2-pyranyl esters of indolyl aliphatic acids. More particularly, the invention relates to the preparation of tetrahydro-2-pyranyl esters of α-(3-indolyl)aliphatic acids from novel tetrahydro-2-pyranyl esters of gamma keto acids, which process comprises treating an acid salt of phenylhydrazine or a substituted phenylhydrazine with a tetrahydro-2-pyranyl ester of a gamma keto acid in the absence of an added catalyst.

The tetrahydro-2-pyranyl α-(3-indolyl)aliphatic acid esters that may be prepared in accordance with the process of this invention have the general structural formula:

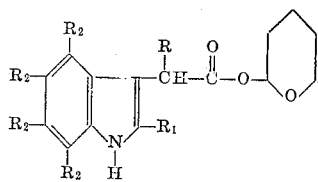

wherein R and $R_1$ are selected from the group consisting of a hydrogen atom and lower alkyl radical; and $R_2$ is selected from the group consisting of hydrogen and halogen atoms, and lower alkyl, lower alkoxy, halogenated alkyl, hydroxy, nitro, cyano, amino, substituted amino, aminomethyl, substituted aminomethyl, dialkylsulfonamido, mercapto and alkylmercapto radicals.

The α-(3-indolyl)aliphatic acids and the corresponding esters thereof, acylated in the N-1 position of the indole nucleus with aroyl groups such as benzoyl and naphthoyl radicals, have been found to be potent anti-inflammatory agents. The preparation of these materials generally involves the acylation of an indolyl acid ester that is unsubstituted in the N-1 position to form an N-acylated indolyl acid ester from which the free acid can be obtained. It has been observed, however, that the N-acyl group is hydrolyzed and, therefore, lost under conditions normally employed for the saponification of the ester to the free acid. For this reason, care must be taken in converting the N-acylated indolyl acid esters to the corresponding free acids. One convenient method of accomplishing this conversion comprises acylation of the tertiary esters of N-unsubstituted indolyl acids, since the resulting tertiary N-acylated indolyl acid esters can be transformed into the free N-acylated indolyl acids by pyrolysis without substantially causing the removal of the N-acyl group. It has also been found that the tetrahydro-2-pyranyl esters of N-unsubstituted indolyl acids behave in a similar manner as the tertiary esters of said acids. The subject invention, therefore, provides a simple, convenient method of preparing tetrahydro-2-pyranyl esters of N-unsubstituted indolyl acids which, after acylation of the N-1 position, can easily be converted to the corresponding free acids.

The most important general method for the formation of indole derivatives is the Fischer indole synthesis which involves the elimination of ammonia from the phenylhydrazones, or substituted phenylhydrazones, of a great variety of aldehydes, ketones or ketonic acids. Accordingly, phenylhydrazine, or a substituted phenylhydrazine, is condensed with an appropriate carbonyl compound to form a corresponding phenylhydrazone, followed by the intramolecular condensation of said phenylhydrazone to form the corresponding indole. It is essential that the intramolecular condensation reaction be performed in the presence of an acidic catalyst, such as, for example, zinc chloride, alcoholic hydrochloric acid, dilute sulfuric acid or glacial acetic acid. Because of the required acid catalyst in the Fischer synthesis, however, it is not possible to prepare tetrahydro-2-pyranyl esters of α-(3-indolyl)aliphatic acids from the phenylhydrazones of gamma keto acid tetrahydro-2-pyranyl esters, since the acidic medium decomposes the gamma keto acid tetrahydro-2-pyranyl esters into the corresponding gamma keto acids and dihydropyran.

It has now been found that the foregoing tetrahydro-2-pyranyl esters of α-(3-indolyl)aliphatic acids can be prepared in a simple one-step method, to wit, by reacting directly, in the absence of an added catalyst, a mixture of an acid salt of phenylhydrazine or substituted phenylhydrazines having at least one unsubstituted ortho position, the chemical structure of which may be represented as follows:

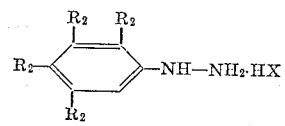

wherein $R_2$ is as previously defined and more fully described hereinafter and HX represents the acid component, and a novel gamma keto acid tetrahydro-2-pyranyl ester of the structure:

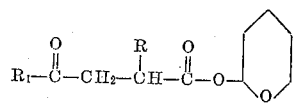

wherein R and $R_1$ are as previously defined and more fully described hereinafter. This reaction of phenylhydrazine acid salts with gamma keto acid tetrahydro-2-pyranyl esters in a substantially neutral medium may be illustrated by the following equation:

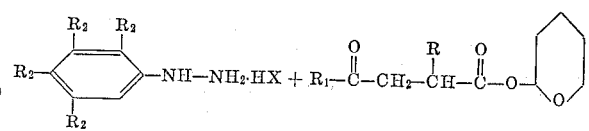

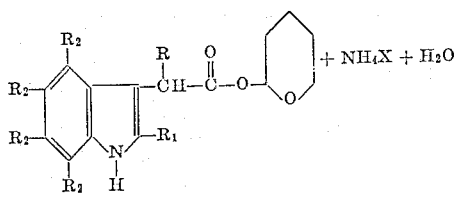

The foregoing reaction is carried out in an organic solvent having, preferably, a boiling point over 50° C. Among the preferred organic solvents that are operable herein are aromatic hydrocarbons, such as, for example, benzene, toluene, xylene, and the like, and aliphatic alcohols, such as, for example, methanol, ethanol, isopropanol, tert-butanol, sec-pentanol, and the like, as well as mixtures of said aromatic hydrocarbons and said aliphatic alcohols. The reaction is advantageously conducted at ambient temperatures although reflux conditions and temperatures above 50° C. are preferred. Stoichiometric quantities (i.e., equimolar) are advantageously employed although a molecular excess of about 10–50 percent of the gamma keto acid tetrahydro-2-pyranyl ester is preferred. The resulting ammonium salt is separated from the reaction mixture and the desired product obtained by conventional laboratory techniques.

The subject process has been found to be particularly suitable for the preparation of tetrahydro-2-pyranyl α-(3-indolyl)aliphatic acid esters, substituted in the 5-position of the indole nucleus, as represented by the formula:

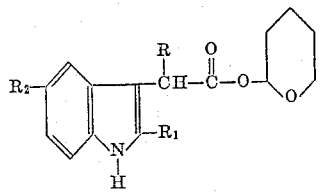

wherein R, $R_1$ and $R_2$ are as defined above, in which case, the starting phenylhydrazine acid salts that are employed must be substituted in the para-position when $R_2$ is a group other than hydrogen.

The phenylhydrazine acid salts that are utilized herein are derived from the interaction of the corresponding phenylhydrazine with an acid (HX) having an ionization constant of at least $10^{-5}$, such as, for example, hydrochloric acid, hydrobromic acid, oxalic acid and acetic acid, the preferred acid being hydrochloric acid. In general, said phenylhydrazines are well known and may be prepared by conventional techniques, such as, for example, the diazotization of the correspondingly substituted aniline with subsequent reduction of the resulting diazo compound.

The substituents represented by $R_2$, which may be the same radical or different radicals, on the phenylhydrazine acid salts are, preferably, lower alkyl, lower alkoxy, nitro, amino and substituted amino groups. Examples of said alkyl and alkoxy radicals are the methyl, ethyl, propyl, tertiary butyl, methoxy, ethoxy, isopropoxy and the like radicals. Examples of said substituted amino radicals are those derived from alkyl amines such as methylamine, ethylamine, dimethylamine, diethylamine and the like; alkanolamines such as ethanolamine, diethanolamine, 2-amino-1-butanol, morpholine and the like; aryl amines such as aniline, diphenylamine and the like; mixed aromatic-aliphatic amines such as monomethylaniline, monoethylaniline and the like; aralkyl amines such as benzylamine, β-phenylethylamine and the like; halo-substituted aliphatic or aromatic amines such as β-chloroethylamine, para-chloroaniline, para-chlorobenzyl amine and the like; and other substituted aliphatic or aromatic amines such as β-methoxy ethylamine, para-tolyl amine, para-methoxy aniline, and the like. $R_2$ is not limited to the foregoing class of substituents, however, and may also represent such substituents as a hydrogen atom; a halogen atom, preferably fluorine; a halogenated alkyl radical, preferably trifluoromethyl; a hydroxy radical; a cyano radical; an aminomethyl; an alkyl substituted aminomethyl radical; a dialkylsulfonamido radical, preferably dimethylsulfonamido; a mercapto radical; and an alkyl mercapto radical. Typical examples of polysubstituted phenylhydrazine acid salts that are operable herein include the acid salts (e.g., the hydrochloride) of 2-chloro-5-methoxyphenylhydrazine, 2 - chloro-4-methoxyphenylhydrazine, 2,4 - dimethylphenylhydrazine, 3 - methyl - 4 - methoxyphenylhydrazine, 2-chloro-5-methylphenylhydrazine, β-naphthylhydrazine, 2-chloro-4,5-dimethylphenyl hydrazine and the like.

In the novel gamma keto acid tetrahydro-2-pyranyl esters of this invention, R and $R_1$ may represent hydrogen atoms or lower alkyl radicals containing up to and including eight carbon atoms although alkyl radicals containing from one to four carbon atoms are preferred, such as, for example, methyl, ethyl, propyl and butyl radicals. A method of preparing said gamma keto acid tetrahydro-2-pyranyl esters comprises treating a keto acid having the formula:

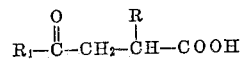

wherein R and $R_1$ are as previously defined, with dihydropyran under acidic conditions. The reaction may be represented by the following equation:

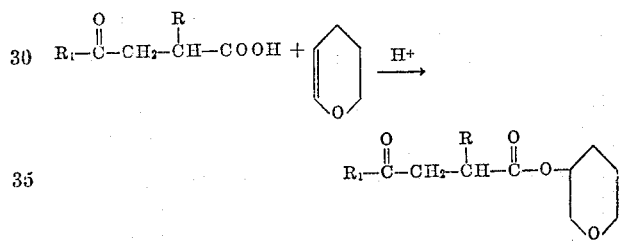

The use of a solvent is not critical and the reaction may be conducted in the absence thereof. Preferably, however, the keto acid is reacted with the dihydropyran in the presence of an inert organic solvent, such as, for example, methylene chloride, chloroform, benzene, dioxane and the like. Stoichiometric quantities (i.e., equimolar) are advantageously employed although a molecular excess of about 10–50 percent of dihydropyran is preferred. The reaction is advantageously conducted at about 25 degrees centigrade although other temperatures from 0° C. to 40° C. can be employed. The reaction is generally completed between 1 to 5 hours. The reaction should be conducted under acidic conditions and acid catalysts, such as, for example, sulfuric acid, para-toluenesulfonic acid, meta-xylene-sulfonic acid, methane-sulfonic acid and the like are advantageously employed. At the end of the reaction period, the acidic catalyst is neutralized as, for example, by treating the reaction mixture with an aqueous solution of a base (e.g., sodium hydroxide, potassium bicarbonate, sodium bicarbonate, sodium carbonate, etc.). The organic layer is separated, washed with water, dried and the solvent evaporated. Due to the rather high boiling points of the resulting tetrahydro-2-pyranyl gamma keto acid esters, the crude products may advantageously be used without further purification in preparing the tetrahydro-2-pyranyl α-(3-indolyl)aliphatic acid esters according to this invention.

The following examples illustrate methods of carrying out the present invention but it is to be understood that these examples are given for purposes of illustration and not of limitation.

EXAMPLE 1

Preparation of tetrahydro-2-pyranyl levulinate

Levulinic acid (116.1 g.) is added portion-wise to a solution of 92 g. of dihydropyran in 200 mls. of benzene containing 0.2 g. of p-toluenesulfonic acid. Although heat is evolved during the addition, the temperature is maintained at 30°–40° C. by external means. The mixture is aged for 4.5 hours at room temperature. In order to neutralize the catalyst, 1 ml. of pyridine is added and the mixture treated with 10% potassium-hydrocarbonate solution. The organic phase is separated, washed with water and dried over MgSO₄. Upon evaporation of the solvent at 30°–35° C. in vacuo, the resulting crude oily ester, tetrahydro-2-pyranyl levulinate, is obtained.

EXAMPLE 2

A. Preparation of tetrahydro-2-pyranyl 2-methyl-5-methoxy-3-indolylacetate 17.5 grams of para-methoxyphenylhydrazine hydrochloride and 22 grams of crude tetrahydro-2-pyranyl levulinate, obtained according to the procedure of Example 1, are added to 80 ml. of tertiary butanol. The mixture is heated under nitrogen with stirring at reflux for 5 hours. The resulting inorganic salt (NH₄Cl) is then removed by filtration and the solvent evaporated in vacuo. The dark brown oily residue is dissolved in 200 ml. of methylenechloride and passed through a column of 100 g. of acid washed alumina made up in methylene chloride. The column is then washed with 250 ml. of methylene chloride and the solution concentrated in vacuo to constant weight. The infrared spectrum of the oily product is consistent with the structure of tetrahydro-2-pyranyl 2-methyl-5-methoxy-3-indolylacetate:

at 2.90, 2.95μ; —COO-ester at 5.80μ; unsaturated ring frequencies at 6.1, 6.24μ.

B. Preparation of tetrahydro-2-pyranyl 2-methyl-5-alkoxy-3-indolylacetates

In accordance with the procedure of Example 2A, but starting, respectively, with an equivalent quantity of p-butoxy, p-propoxy, and p-ethoxy substituted phenylhydrazine hydrochloride, in lieu of the p-methoxyphenylhydrazine hydrochloride, there are obtained as products the respective tetrahydro-2-pyranyl esters of the corresponding 2-methyl-5-alkoxy-3-indolylacetic acids.

EXAMPLE 3

The procedure of Example 2A is followed using an equivalent quantity of phenylhydrazine hydrochloride in place of the p-methoxyphenylhydrazine hydrochloride to produce 2-methyl-3-indolylacetic acid tetrahydro-2-pyranyl ester.

EXAMPLE 4

The procedure of Example 2A is following is used using an equivalent quantity of p-fluorophenylhydrazine hydrochloride in place of p-methoxyphenylhydrazine hydrochloride to produce 2-methyl-5-fluoro-3-indolylacetic acid tetrahydro-2-pyranyl ester.

Similarly, the use of an equivalent quantity of p-trifluoromethylhydrazine hydrochloride in place of p-methoxyphenylhydrazine hydrochloride affords the corresponding 2-methyl-5-trifluoromethyl-3-indolylacetic acid tetrahydro-2-pyranyl ester.

EXAMPLE 5

The procedure of Example 2A is followed using an equivalent quantity of p-methylphenylhydrazine hydrochloride in place of p-methoxyphenylhydrazine hydrochloride to produce 2,5 - dimethyl - 3 - indolylacetic acid tetrahydro-2-pyranyl ester.

Similarly, the use of equivalent quantities of p-ethylphenylhydrazine hydrochloride and p-butylphenylhydrazine hydrochloride, respectively, in place of p-methoxyphenylhydrazine hydrochloride affords the corresponding 2-methyl-5-alkyl-3 -indolylacetic acid tetrahydro-2-pyranyl ester.

EXAMPLE 6

The procedure of Example 2A is followed using an equivalent quantity of p-dimethylaminophenylhydrazine hydrochloride in place of p-methoxyphenylhydrazine hydrochloride to produce 2-methyl-5-dimethylamino-3-indolylacetic acid tetrahydro-2-pyranyl ester.

Similarly, the use of equivalent quantities of p-dimethylsulfonaminophenylhydrazine hydrochloride and p-diethylaminophenylhydrazine hydrochloride, respectively, in place of p-methoxyphenylhydrazine hydrochloride, affords the corresponding 2-methyl-5-substituted-3-indolylacetic acid tetrahydro-2-pyranyl esters.

EXAMPLE 7

The procedure of Example 2A is followed using an equivalent quantity of p-nitrophenylhydrazine hydrochloride in place of p-methoxyphenylhydrazine hydrochloride to produce 2 - methyl - 5 - nitro - 3 - indolylacetic acid tetrahydro - 2 - pyranyl ester.

Similarly, the use of an equivalent quantity of p-cyanophenylhydrazine hydrochloride in place of p-methoxyphenylhydrazine hydrochloride affords the corresponding 2 - methyl - 5 - cyano - 3 - indolylacetic acid tetrahydro-2 - pyranyl ester.

EXAMPLE 8

The procedure of Example 2A is followed using an equivalent quantity of the tetrahydro - 2 - pyranyl ester of the acid C₂H₅COCH₂CH₂COOH in place of tetrahydro - 2 - pyranyl levulinate to produce 2 - ethyl - 5-methoxy - 3 - indolylacetic acid tetrahydro - 2 - pyranyl ester.

Similarly, equivalent quantities of the tetrahydro - 2- pyranyl esters of the acids C₃H₇COCH₂CH₂COOH and C₄H₉COCH₂CH₂COOH, used in place of tetrahydro - 2- pyranyl levulinate, afford the corresponding 2 - propyl and 2 - butyl - 5 - methoxy - 3 - indolyacetic acid tetrahydro - 2 - pyranyl esters, respectively. Furthermore, the use of equivalent quantities of the other phenylhydrazine hydrochlorides described in Examples 2–7 in place of p-methoxyphenylhydrazine hydrochloride in this example, affords the corresponding 2 - ethyl, 2 - propyl and 2-butyl - 5 - substituted - 3 - indolylacetic acid tetrahydro-2 - pyranyl esters.

EXAMPLE 9

The procedure of Example 2A is followed using an equivalent quantity of tetrahydro - 2 -pyranyl α - methyl levulinate in place of tetrahydro - 2 - pyranyl levulinate to produce α - (2 - methyl - 5 - methoxy - 3 - indolyl) propionic acid tetrahydro - 2 - pyranyl ester. Similarly, equivalent quantities of tetrahydro - 2 - pyranyl α - ethyl levulinate, tetrahydro - 2 - pyranyl α - propyl levulinate and tetrahydro - 2 - pyranyl α - butyl levulinate, used in place of tetrahydro - 2 - pyranyl levulinate, afford the corresponding α - indolyl - butyric, α - indolyl pentanoic, and α - indolylcaproic acid tetrahydro - 2 - pyranyl esters, respectively.

Furthermore, the use of the phenylhydrazine hydrochlorides in Examples 2–7, other than p-methoxyphenylhydrazine hydrochloride, with the tetrahydro - 2 - pyranyl esters of this example, in equivalent quantities, affords the corresponding α - (2 - methyl - 5 - substituted - 3 - indolyl) aliphatic acid tetrahydro - 2 - pyranyl esters.

EXAMPLE 10

Preparation of tetrahydro-2-pyranyl-2,4,5-trimethyl-7-chloro-3-indolylacetate

A mixture of 20.7 grams of 2 - chloro - 4,5 - dimethylphenylhydrazine - HCl and 20.0 grams of tetrahydro-2 - pyranyl levulinate in 100 ml. of t-butanol is refluxed for 6 hours. After cooling to 25° C., the resulting ammonium chloride is filtered off. The solvent is removed in vacuo and the crude tetrahydro - 2 - pyranyl ester of 2,4,5 - trimethyl - 7 - chloro - 3 - indolylacetic acid is recovered and purified as described in Example 2A.

EXAMPLE 11

The procedure of Example 1 is followed using an equivalent quantity of the acids $C_2H_5COCH_2CH_2COOH$, $C_3H_7COCH_2CH_2COOH$, $C_4H_9COCH_2CH_2COOH$ $CH_3COCH_2CH(CH_3)COOH$ and $HCOCH_2CH_2COOH$ in place of the levulinic acid used therein to produce the respective tetrahydro - 2 - pyranyl esters thereof.

Various changes and modifications may be made in carrying out the present invention without departing from the spirit and scope thereof. Insofar as these changes and modifications are within the purview of the annexed claims, they are to be considered as part of our invention.

We claim:
1. A gamma keto acid tetrahydro - 2 - pyranyl ester having the formula:

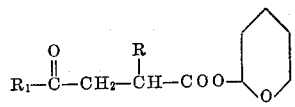

wherein R and $R_1$ are selected from the group consisting of a hydrogen atom and lower alkyl radicals.

2. Tetrahydro - 2 - pyranyl levulinate.

References Cited

UNITED STATES PATENTS 3,161,654 12/1964 Shen _____ 260—326.12
2,504,797 4/1950 Bremner et al. _____ 260—345.8

FOREIGN PATENTS 615,395 9/1962 Belgium.

JOHN D. RANDOLPH, *Primary Examiner.*

WALTER A. MODANCE, *Examiner.*

J. M. FORD, *Assistant Examiner.*